(No Model.)
A. F. PRATT.
FLOOR OILING AND RUBBING APPLIANCE.
No. 597,246. Patented Jan. 11, 1898.
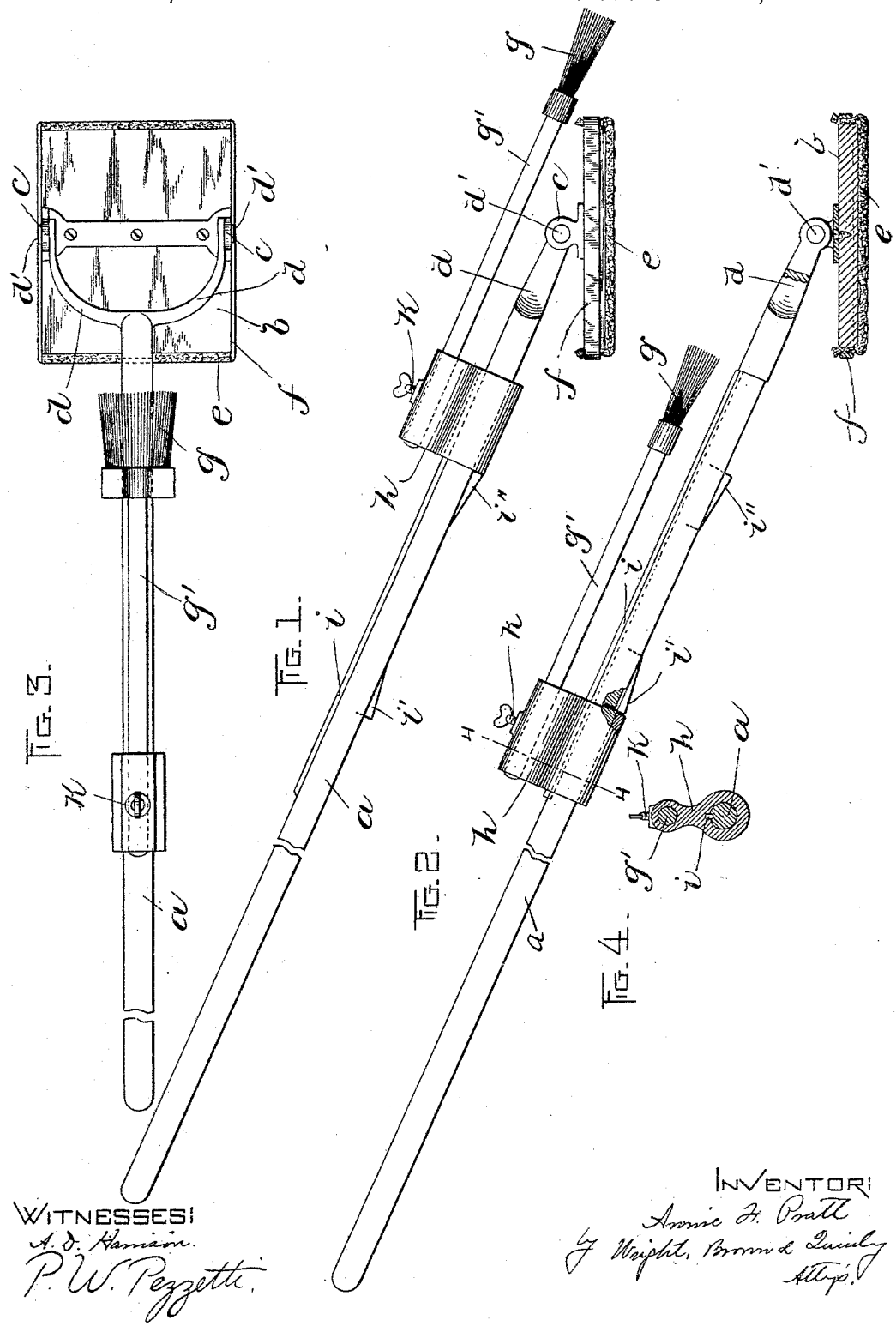
WITNESSES:
A. D. Harrison.
P. W. Pezzetti.
INVENTOR:
Annie F. Pratt
by Wright, Brown & Quinby
Attys.

UNITED STATES PATENT OFFICE.

ANNIE F. PRATT, OF CAMBRIDGE, MASSACHUSETTS.

FLOOR OILING AND RUBBING APPLIANCE.

SPECIFICATION forming part of Letters Patent No. 597,246, dated January 11, 1898.

Application filed May 22, 1897. Serial No. 637,731. (No model.)

*To all whom it may concern:*

Be it known that I, ANNIE F. PRATT, of Cambridge, in the county of Middlesex and State of Massachusetts, have invented certain new and useful Improvements in Floor Oiling and Rubbing Appliances, of which the following is a specification.

This invention has for its object to provide a convenient appliance for oiling and rubbing wooden floors. It is well known that floors which are intended to be left bare require frequent oiling and rubbing, the two operations being performed successively, the rubbing taking place after the application of the oil.

The present invention has for its object to provide a single appliance whereby the floor can be first oiled and then rubbed while the operator is occupying a standing position, the two operations being therefore performed easily, conveniently, and rapidly.

The invention consists in the improved appliance which I will now proceed to describe and claim.

Of the accompanying drawings, forming a part of this specification, Figure 1 represents a side elevation of my improved appliance, showing it adjusted for the operation of oiling. Fig. 2 represents a view similar to Fig. 1, showing the appliance adjusted for rubbing. Fig. 3 represents a plan view of the appliance adjusted as shown in Fig. 2. Fig. 4 represents a section on line 4 4 of Fig. 2.

The same letters of reference indicate the same parts in all the figures.

In the drawings, $a$ represents an elongated rod or handle which is or may be similar in its form and size to that of an ordinary carpet-sweeper. One end of the handle is provided with means for pivotal connection with a flat plate $b$, of wood or other suitable material, the connection between said plate and handle being here shown as comprising ears $c\ c$, affixed to the back of the plate, and arms $d\ d$, affixed to the handle and having trunnions $d'\ d'$, which enter orifices in the ears $c\ c$. Any other suitable connecting means may be employed which will permit the plate to rest upon the floor, while the handle may swing upon the plate.

To the plate $b$ is secured in any suitable manner a facing $e$, which for floor-rubbing purposes may be of felt or flannel. I prefer to provide means for the ready attachment and removal of the facing, such means as here shown being a marginal frame $f$, which is preferably of metal, and is formed to surround the margin of the plate $b$ and the upwardly-turned edges of the facing $e$, said edges being interposed between the frame $f$ and the margin of the plate, the size of the frame being such that it tightly confines the edges of the facing against the margin of the plate, but can be slipped off without difficulty when it is desired to remove the facing and apply a new one.

$g$ represents a brush adapted to apply oil to a floor. Said brush has a stock or handle $g'$, which has a sliding connection with the rod or handle $a$, the stock $g'$ and brush $g$ being adapted to be moved to various positions on the handle $a$, as shown in Figs. 1 and 2, the object being to permit the brush to be moved downwardly and to project beyond the plate $b$ sufficiently to apply oil to a floor above which said plate is held, as shown in Fig. 1, or to be moved upwardly on the handle $a$ and thus held away from contact with the floor when the plate $b$ is acting thereon, as shown in Fig. 2. Any suitable means may be employed to connect the brush-stock $g'$ with the handle $a$ in such manner as to permit the described adjustments of the brush. I have here shown the brush-stock $g'$ affixed to a slide $h$, which is formed to embrace and move upon the handle $a$, said slide having an orifice through which the handle $a$ passes. The slide $h$ may be prevented from turning on the handle by means of a spline $i$ on the handle entering a groove in the slide, or the spline and groove may be reversed, the spline being on the slide and the groove in the handle.

I prefer to employ a suitable catch or detent to hold the slide $h$ in its retracted position (shown in Fig. 2) and another catch or detents to hold the slide in its projected position. (Shown in Fig. 1.) Said catches or detent may conveniently be bent pieces $i'\ i''$, of spring-wire, similar to the catches used in umbrella-handles to hold the umbrella-runner. The catch $i'$ is arranged to bear against the lower end of the slide $h$ to hold it in its retracted position, while the slide $i''$ is arranged to bear upon the upper end of the slide and hold it in its projected position. I do not limit myself to these particular detent or stop devices and may use any other suitable means for retaining the brush in either of the positions shown.

The operation of the above-described appliance is as follows: The brush is first adjusted to the position shown in Fig. 1, and the appliance is then used for oiling the floor. The brush is then withdrawn to the position shown in Figs. 2 and 3, and the appliance is used for rubbing over the oiled surface, the plate $b$ being allowed to bear upon the floor, so that its facing $e$ rubs in the oil. If desired, the appliance may be used for rubbing or dusting walls, in which case it will be preferable to use a sheet of sheepskin for the facing $e$. The sheepskin facing may also be used for dusting floors.

The brush-stock $g'$ may be detachably secured to the slide $h$ by means such as a set-screw $k$, so that different brushes can be used interchangeably.

I do not limit myself to the particular devices here shown for slidingly connecting the brush $g$ to the rod or handle $a$, and these devices may be variously modified without departing from the spirit of my invention.

It will be understood that when the brush $g$ is used for oiling, the rod or handle $a$ will be held in a more nearly vertical position than that shown in Fig. 1, thus elevating the plate $b$ from the floor, so that it will not touch the freshly-oiled surface unless this is desired by the operator.

I claim—

1. An appliance of the character specified, comprising a rubbing-plate, a handle pivotally secured thereto, and a brush movable on the handle and adapted to be projected beyond the rubbing-plate, and to be withdrawn from said projected position.

2. An appliance of the character specified, comprising a rubbing-plate, a handle pivotally secured thereto, a brush movable on the handle and adapted to be projected beyond the rubbing-plate and to be withdrawn from said projected position, and means for detachably securing the brush to the said handle.

3. An appliance of the character specified, comprising a rubbing-plate, a handle pivotally secured thereto, a slide movable on the handle, a brush secured to the slide, and catches or detents arranged to secure the slide to the handle in different positions.

In testimony whereof I have signed my name to this specification, in the presence of two subscribing witnesses, this 15th day of May, A. D. 1897.

ANNIE F. PRATT.

Witnesses:
A. D. HARRISON,
P. W. PEZZETTI.